United States Patent [19]

Coetzer

[11] Patent Number: 4,975,345
[45] Date of Patent: Dec. 4, 1990

[54] ELECTROCHEMICAL CELL

[75] Inventor: Johan Coetzer, Pretoria, South Africa

[73] Assignee: Lilliwyte Societe Anonyme, Luxembourg, Luxembourg

[21] Appl. No.: 483,204

[22] Filed: Feb. 21, 1990

[30] Foreign Application Priority Data

Feb. 21, 1989 [GB] United Kingdom ............ 8903900

[51] Int. Cl.$^5$ ......................................... H01M 10/36
[52] U.S. Cl. .................................. 429/103; 429/199; 429/218
[58] Field of Search ............ 429/103, 102, 104, 199, 429/218, 112

[56] References Cited

U.S. PATENT DOCUMENTS

| | | | |
|---|---|---|---|
| 3,225,098 | 12/1965 | Saunders et al. ................ | 429/103 |
| 3,907,589 | 9/1975 | Gay et al. ........................ | 429/103 |
| 3,929,504 | 12/1975 | Gore et al. ...................... | 429/199 X |
| 4,287,268 | 9/1981 | Coetzer ........................... | 429/103 |
| 4,287,269 | 9/1981 | Coetzer et al. ................. | 429/103 |
| 4,546,055 | 10/1985 | Coetzer et al. ................. | 429/103 |
| 4,797,333 | 1/1989 | Coetzer et al. ................. | 429/103 |

Primary Examiner—Anthony Skapars
Attorney, Agent, or Firm—Arnold, White & Durkee

[57] ABSTRACT

An electrochemical cell 10 comprises, in its charged state, an anode 14 comprising, as an active anode substance, (i) a metal halide $T(1)^{m+}X_m{}^-$ where T(1) is a metal selected from the group consisting in the first series of transition elements, the second series of transition elements, tungsten, aluminium, silicon, tin and lead, m+ is the valency of the metal T(1), and X is a halogen. The cell also comprises a cathode 18 comprising, as an active cathode substance, a metal halide $T(2)^{n+}X_n{}^-$, where T(2) is a metal selected from the group consisting in the first series of transition elements, the second series of transition elements, tungsten, aluminium, silicon, tin and lead, n+ is the valency of the metal T(2), and X is a halogen. The cell further comprises a liquid electrolyte 22, E, containing halogen ions $X^-$, when the active anode and cathode substances are $T(1)^{m+}X_m{}^-$ and $T(2)^{n+}X_n{}^-$ respectively, as well as at least one compatible cation, with the active anode and cathode substances being substantially insoluble in the electrolyte at the operating temperature of the cell, at all states of charge and discharge.

15 Claims, 4 Drawing Sheets

ELECTROCHEMICAL CELL

This invention relates to an electrochemical cell.

According to the invention, there is provided an electrochemical cell which comprises, in its charged state, an anode comprising, as an active anode substance, (i) a metal halide $T(1)^{m+}X_m{}^-$ where $T(1)$ is a metal selected from the group consisting in the first series of transition elements, the second series of transition elements, tungsten, aluminum, silicon, tin and lead, $m+$ is the valency of the metal $T(1)$, and X is a halogen;

a cathode comprising, as an active cathode substance, a metal halide $T(2)^{n+}X_n{}^+$, where $T(2)$ is a metal selected from the group consisting in the first series of transition elements, the second series of transition elements, tungsten, aluminium, silicon, tin and lead, $n+$ is the valency of the metal $T(2)$, and X is a halogen; and a liquid electrolyte, E, containing halogen ions $X^-$, when the active anode and cathode substances are $T(1)^{m+}X_m{}^-$ and $T(2)^{n+}X_n{}^-$ respectively, as well as at least one compatible cation, with the active anode and cathode substances being substantially insoluble in the electrolyte at the operating temperature of the cell, at all states of charge and discharge.

The reactions which take place, on discharging of the cell, are as follows:

Anode: $T(1)^{m+}X_m{}^- + aX^- \rightarrow T(1)^{(m+a)+}X_{(m+a)}{}^-$

Cathode: $T(2)^{n+}X_n{}^- - aX^- \rightarrow T(2)^{(n-a)+}X_{(n-a)} + X^-_{(n-a)}$ Overall:

$T(1)^{m+}X_m{}^-(\text{anode}) + T(2)^{n+}X_n{}^-(\text{cathode}) \rightarrow T(1)^{(m+a)+}X_{(m+a)}{}^-(\text{anode}) + T(2)^{(n-a)+}X_{(n-a)}{}^-(\text{cathode})$ Hence, during discharge, the anode $T(1)^{m+}X_m{}^-$ is oxidized, with $T(1)^{m+}X_m{}^-$ being halogenated and the valency of $T(1)$ increasing from $m+$ to $(m+a)+$. Similarly, during discharge, the cathode $T(2)^{n+}X_n{}^-$ is reduced, with $T(2)^{n+}X_n{}^-$ is reduced, with $T(2)^{n+}X_n{}^-$ being dehalogenated and the valency of $T(2)$ decreasing from $n+$ to $(n+a)+$.

While X of the anode and the cathode can be different species, it is envisaged that they will usually be the same species. The electrochemical reaction of the cell is hence characterized by the halogenation of the transition metal of one electrode and the dehalogenation of the transition metal of the second electrode.

It is believed that the halogenation or dehalogenation of the electrodes can be enhanced by the addition of a solid phase AX in the presence of the electrolyte E, where A is a compatible cation, typically an alkali metal. The solid phase AX will then be located in close proximity to the electrodes. It is believed that the conductivity of the electrolyte E can be attributed either to the diffusion of cations of the electrolyte, or to the diffusion of anions, or to the diffusion of both cations and anions, depending on the transfer number of the cations and anions in the electrolyte. The direction of diffusion of the cations is necessarily opposite to that of the anions.

In principle, the electrolyte can be any suitable organic or inorganic electrolyte, operable at room temperature or elevated temperature, provided that it satisfies the requirements set out above, viz that it contains halogen ions $X^-$, that the active anode and cathode substances are substantially insoluble therein at the cell operating temperature at all states of charge and discharge, and that the electrolyte is capable of transferring either cations or anions, or both cations and anions, from the one electrode to the other.

For example, it can be a molten alkali metal halide salt, optionally doped with aluminium or zinc halide to lower its melting point, wherein the halide is the same as X. Hence, the electrolyte may be a salt of the form $M^1M^2X_d$, where $M^1$ is an alkali metal, i.e. Na, Li or K, $M^2$ is Al or Zn, and $d=b+c$, where b is the valency of $M^1$ and c is the valency of $M^2$. The electrolyte may, for example, be in the form of an alkali metal halide-aluminium halide mixture or double salt, such as $NaAlCl_4$ in which the proportion or ratio of alkali metal ions and aluminium ions is about one, to obtain substantial insolubility of the active anode and cathode substances therein. This proportion can vary but should preferably not be less than one, to obtain the substantial insolubility or minimum solubility.

In one embodiment of the invention, $T(1)$ and $T(2)$ may be different metals. When $T(1)$ is Fe and $T(2)$ is Ni, the overall cell discharge reaction is:

$$Fe + Ni^{2+}X_2{}^- \rightarrow Fe^{2+}X_2{}^- + Ni.$$

For example, when X is chlorine, E is $NaAlCl_4$ and AX is NaCl, the overall cell discharge reaction becomes $$Fe + NiCl_2 \xrightarrow[NaCl]{NaAlCl_4} FeCl_2 + Ni$$

In the charged state, this cell hence consists of an iron anode and a nickel dichloride cathode, both of which are substantially insoluble in the molten salt electrolyte $NaAlCl_4$, which has a melting point of 152° C. The open circuit voltage of this cell is 240 mV, and its typical operating temperature is 250° C. During discharge, the iron is oxidized at the anode to form $FeCl_2$, while the nickel dichloride is reduced to form metallic nickel at the cathode.

The $NaAlCl_4$ electrolyte should be kept basic at all times by ensuring that excess NaCl is present so that the $NaCl:AlCl_3$ ratio is always greater than 1:1. The solubility of $NiCl_2$ and $FeCl_2$ in such a melt is very low, whereas their solubility is greatly increased in an acid-rich melt, i.e. one in which the $NaCl:AlCl_3$ ratio is less than 1:1.

It is believed that the presence of the excess salt in the cell system is important, not only for ensuring the basicity of the melt, but also to assist in rapid halogenation and dehalogenation which occurs at the anode and cathode during charge and discharge. It is believed that this may occur by the following possible mechanism in which there is a ready exchange between the chloride ions of the solid NaCl phase and the liquid $NaAlCl_4$ phase under the dynamic conditions of cell operation, viz $$NaCl' + NaAlCl_4'' \rightarrow NaCl'' + NaAlCl_3''Cl'.ps$$

With such a mechanism it is hence possible that the chlorination of the transition metal can occur via the $Cl^-$ ions of the NaCl particles and not necessarily only via the $Cl^-$ ions of the molten salt electrolyte $NaAlCl_4$ phase, for example:

Anode reaction: $Fe + 2NaCl' + NaAlCl_4'' \rightarrow FeCl'_2 + NaAlCl_4'' + 2Na^+ + 2e$ Cathode reaction: $NiCl_2''' + NaAlCl_4'' + 2Na^+ + 2e \rightarrow Ni + 2NaCl''' + NaAlCl_4''$ Overall: $Fe + 2NaCl' + 2NaAlCl_4'' + NiCl_2''' \rightarrow FeCl_2' + 2NaAlCl_4'' + 2NaCl''' + Ni$ Hence, in this reaction, charge transfer occurs by the movement of Na+ ions from the anode to the cathode during discharge, even though the Na+ ions do not necessarily partake in the electrochemical oxidation or reduction process which occurs at the two electrodes; in this case the transfer number of the Na+ cations is 1 and the transfer number of the anions is zero.

However, in practice, in this particular example, it is believed that the current is carried by both cations and anions, but predominantly by the cations.

The cell may include a suitable separator separating the anode from the cathode so that the anode is located in an anode compartment and the cathode in a cathode compartment. The separator may be a solid conductor, e.g. sodium beta alumina, in which case electrical charge transfer between the anode and cathode compartments is carried solely by Na+ ions.

It is further believed that on cycling of the cell between its charged and uncharged states, the Cl', Cl" and Cl''' ions of the initial electrode and electrolyte components become randomly mixed amongst these components.

When T(1) is Ti and T(2) is Mn, the overall cell discharge reaction is:

$$Ti + Mn^{2+}X_2^- \rightarrow Ti^{2+}X_2^- + Mn.$$

When T(1) is Mn and T(2) is Ni, the overall cell discharge reaction is:

$$Mn + Ni^{2+}X_2^- \rightarrow Mn^{2+}X_2^- + Ni$$

In another embodiment of the invention, T(1) and T(2) may be the same metal, which metal will hence have a number of oxidation states, e.g. Cr, V or Pb. For example, when T(1) and T(2) are Cr, the cell discharge reaction can be as follows:

Anode: $Cr^o + 3X^- \rightarrow Cr^3 + X_3$
Cathode: $Cr^6 + X_6 - 3X^- \rightarrow Cr^3 + X_3$
Overall: $Cr^o(anode) + Cr^6 + X_6(cathode) \rightarrow Cr^3 + X_3(anode) + Cr^3 + X_3(cathode)$ When T(1) and T(2) are V, the overall cell discharge reaction can be:

$$V(anode) + 2VX_3(cathode) \rightarrow VX_2(anode) + 2VX_2(cathode)$$

It may be desirable to include, in the electrolyte, a minor proportion of an additive capable of suppressing the solubility of the active anode and cathode substances therein. Such an additive may be F−, Br−, or S=. For example, the dopant may be NaF. The NaF could form part of the AX solid phase as described hereinbefore. The proportion of NaF will, however, be sufficiently low for the electrolyte to retain its essential character as a sodium aluminium chloride electrolyte.

The invention will now be described by way of example, with reference to the accompanying diagrammatic drawings.

Figure 1:
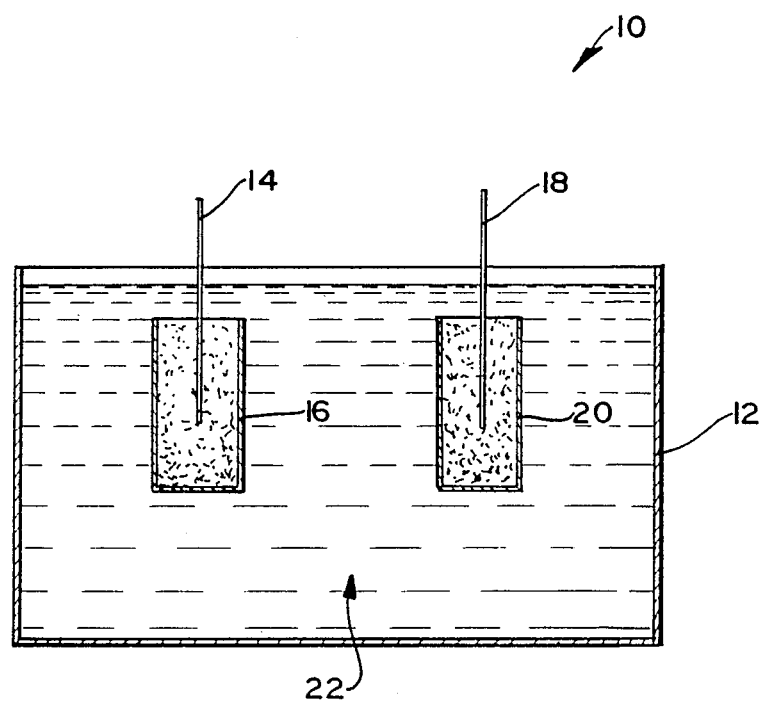
FIG. 1 shows a schematic sectional side elevation of an electrochemical cell according to one embodiment of the invention.

Referring to FIG. 1 of the drawings, reference numeral 10 generally indicates an electrochemical cell according to one embodiment of the invention.

The cell 10 includes a housing 12. Into the housing protrudes an Fe electrode or anode 14. The lower end of the electrode 14 is surrounded by a porous container 16, e.g. of graphite, which is such that solid NaCl contained therein cannot pass from it.

Into the housing also protrudes an Ni electrode or cathode 18, the lower end of which is also enclosed by a porous container 20 which is similar to the container 16.

Into the container 16 is initially loaded a mixture of Fe particles, NaCl particles and NaAlCl4, while there is loaded into the container 20 a mixture of NiCl2 particles, NaCl particles and NaAlCl4, admixed with nickel particles to act as current collector. The housing is loaded with NaAlCl4, as indicated by reference numeral 22, with the NaAlCl4 surrounding the containers 16, 20. This provides an electrochemical cell in charged state.

During discharge of the cell, at an operating temperature at which the NaAlCl4 is molten e.g. about 250° C., the following reaction takes place:

$$Fe + NiCl_2 \rightarrow FeCl_2 + Ni.$$

The open circuit voltage for this cell is about 0.24 V.

Figure 2:
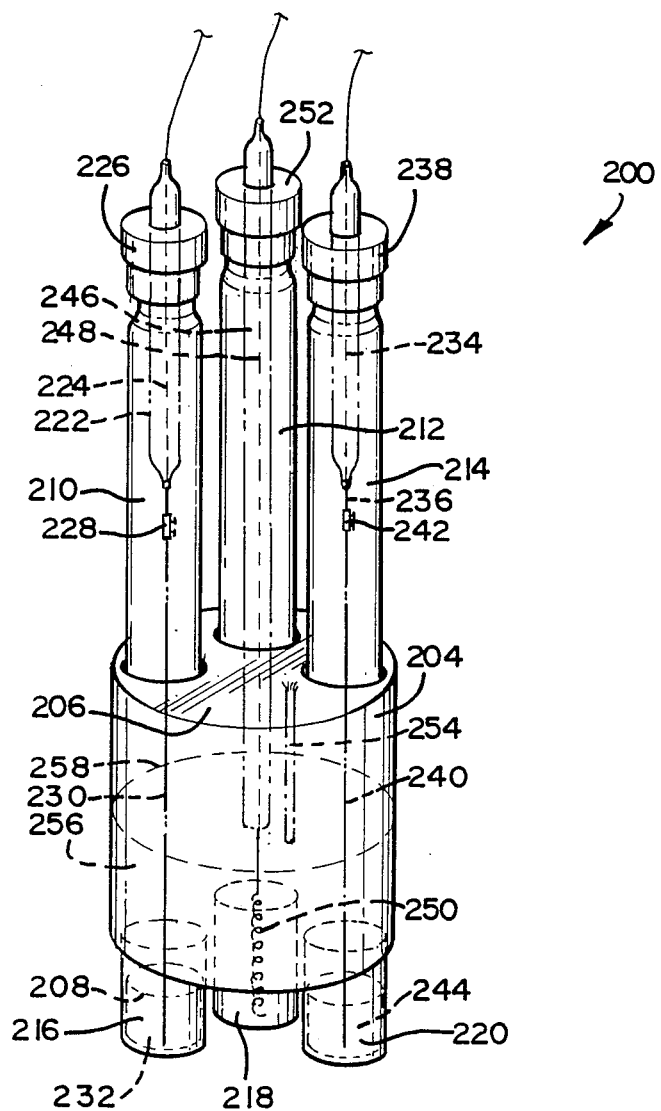
FIG. 2 shows schematically, a laboratory apparatus simulating an electrochemical cell in accordance with the invention, and with which a number of cell configurations were tested.

Referring to FIG. 2, reference numeral 200 generally indicate laboratory apparatus simulating an electrochemical cell in accordance with the invention.

The apparatus or cell 200 includes a housing generally indicated by reference numral 202. The housing 202 includes a cylindrical portion 204, with its ends closed off by means of end caps 206, 208 respectively.

From the end cap 206 protrude three cylindrical body members 210, 212 and 214, with the interiors of the members 210, 212 and 214 being in communication with the inside of the cylindrical portion 204. Similar cylindrical body members 216, 218 and 220 protrude from the end cap 208 with the members 210, 216; 212, 218 and 214, 220 being aligned with each other.

Into the open end of the body member 210 protrudes a glass holder 222 holding a tungsten wire 224, with the glass holder being held in position by means of a Teflon TM bushing 226. To the tungsten wire 224 is connected, by means of a connector 228, a current collector 230. The current collector 230 is embedded in a metal/salt sinter 232 located inside the body member 216.

Similarly, into the body member 214 protrudes a glass holder 234 holding a tungsten wire 236, with the holder 234 held in position by means of a Teflon TM bushing 238. A current collector 240 is connected to the tungsten wire 236 by means of a connector 242, with the current collector 240 being embedded in a metal/salt sinter 244 located inside the body member 220.

Into the body member 212 protrudes a glass holder 246 holding an aluminium wire 248, the free end 250 of which is located inside the body member 218. The glass holder is also held by a Teflon TM bushing 252.

A thermocouple well 254 protrudes into the cylindrical body portion 204.

The wires 224, 236 and 248 which protrude from their glass holders are connected to a potentiostat (not shown), while the body members 216, 218 and 220 and the body portion 204 are filled with electrolyte 256 up to a level 258.

For each of the tests or experiments conducted, as described in more detail hereunder, the following steps were followed:

To form the anode or cathode, a powder of the metal in question and sodium chloride powder were mixed together. The mixture was co-sintered with a wire current collector 230 or 240 in a graphite mould under hydrogen at an elevated temperature for one hour, to form the sinter 232 or 244. Thereafter the electrode thus formed was allowed to cool down under hydrogen and the graphite mould removed, prior to using it in the laboratory apparatus 200.

For each cell configuration tested, one electrode was anodized to form the metal chloride, using the aluminium counter electrode 250. The aluminium electrode was then removed, and the test cell thus formed cycled at various rates.

The NaAlCl$_4$ electrolyte was prepared as a basic, i.e. NaCl saturated, melt by mixing NaCl and AlCl$_3$ in a molar ratio of about 52:48. This is to ensure virtual insolubility of the species involved in the melt. The electrolyte was handled, and the laboratory cell operated, in a nitrogen-filled glove box to ensure that no air came into contact with the electrolyte.

EXPERIMENT 1

A iron/nickel cell in accordance with the invention was simulated with the laboratory scale installation. Such a cell or system has the following charge/discharge reaction:

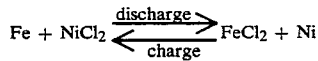

$$Fe + NiCl_2 \underset{charge}{\overset{discharge}{\rightleftarrows}} FeCl_2 + Ni$$

The electrode specifications for this cell or system were as given in Table 1:

TABLE 1

|  | IRON | NICKEL |
| --- | --- | --- |
| Backbone metal | Fe | Ni |
| Current collector | Fe | Ni |
| % conversion of metal | 30 | 40 |
| Sintering temperature (° C.) | 750 | 790 |
| Mass metal (g) | 0.303 | 0.298 |
| Mass NaCl (g) | 0.191 | 0.237 |
| Theoretical electrode capacity (mAh)* | 88 | 109 |

*Theoretical cell capacity = 88 mAh

Figure 3:
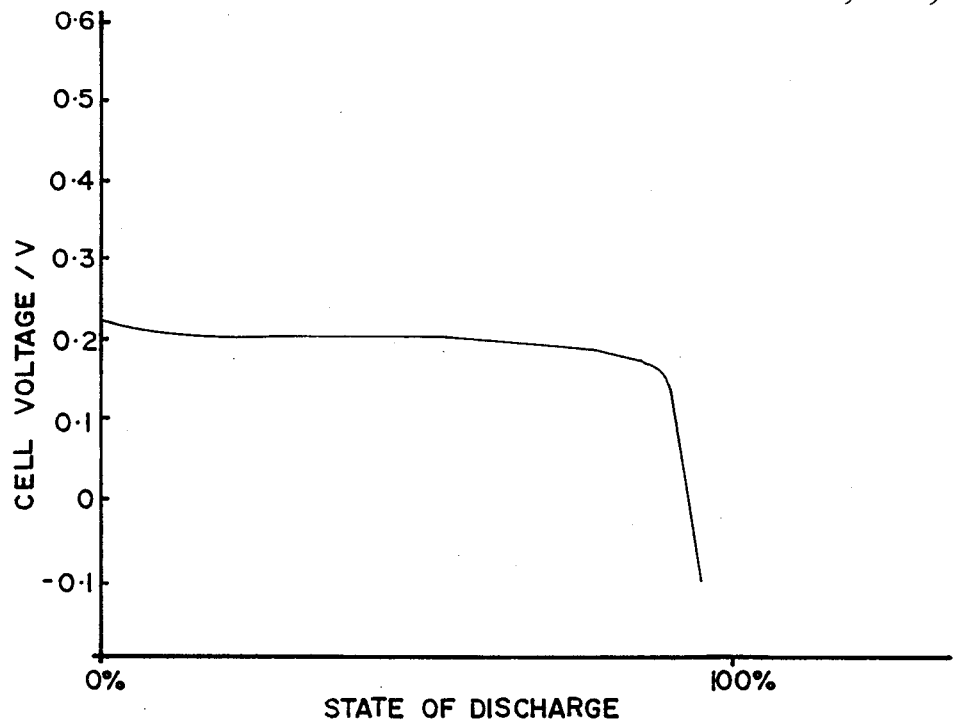
FIGS. 3, 4 and 5 show charge/discharge curves for different cell configurations in the laboratory installation of FIG. 3.

This system or cell was operated at 250° C., and a current of 20 mA. FIG. 3 shows a discharge curve for this cell or system at a 4.4 hour rate. The cell was cycled a number of times. The open circuit voltage ('OCV') was 0.260 V and 0.248 V during first and second stages of discharge respectively.

EXPERIMENT 2

In this experiment a vanadium/vanadium cell or system was tested. Such a cell or system has a charge/discharge reaction as follows:

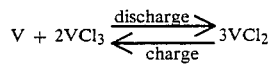

$$V + 2VCl_3 \underset{charge}{\overset{discharge}{\rightleftarrows}} 3VCl_2$$

The discharge reaction can also be expressed as follows:

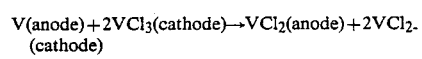

V(anode)+2VCl$_3$(cathode)→VCl$_2$(anode)+2VCl$_2$(cathode)

The electrode specifications were as set out in Table 2.

TABLE 2

|  | V(1) | V(2) |
| --- | --- | --- |
| Backbone metal | Ni | Ni |
| Current collector | Ni | Ni |
| % conversion of metal | 40 | 40 |
| Sintering temperature (° C.) | 790 | 790 |
| Mass metal (V) (g) | 0.052 | 0.108 |
| Mass NaCl (g) | 0.120 | 0.373 |
| Mass backbone metal (Ni) (g) | 0.090 | 0.187 |
| Theoretical electrode capacity during cycling (mAh)* | 55 | 55 (cell) |

*theoretical cell capacity = 55 mAh

The detailed reactions taking place are as follows:
Preparation of cathode by anodization, i.e. oxidation of V to VCl:

2V+6NaCl→2VCl$_3$+6Na$^+$+6e$^-$

Cell reaction:

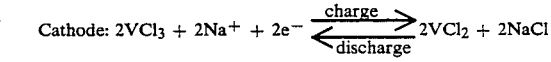

Cathode: 2VCl$_3$ + 2Na$^+$ + 2e$^-$ $\underset{discharge}{\overset{charge}{\rightleftarrows}}$ 2VCl$_2$ + 2NaCl

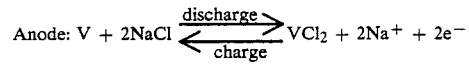

Anode: V + 2NaCl $\underset{charge}{\overset{discharge}{\rightleftarrows}}$ VCl$_2$ + 2Na$^+$ + 2e$^-$

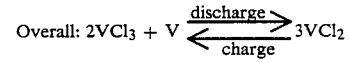

Figure 4:
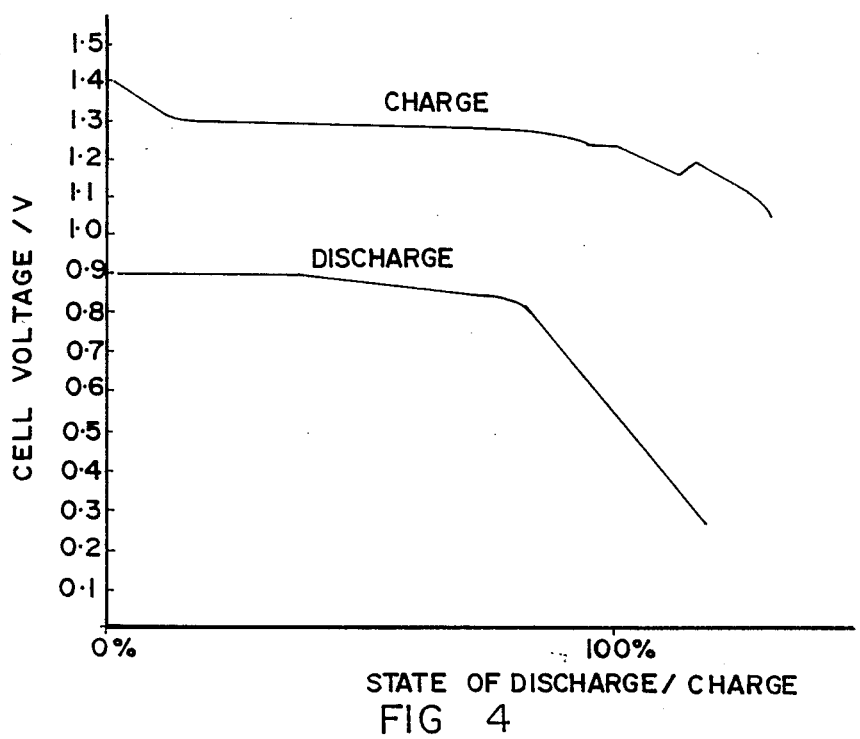

Overall: 2VCl$_3$ + V $\underset{charge}{\overset{discharge}{\rightleftarrows}}$ 3VCl$_2$ A charge/discharge curve for this cell or system, cycled in steps at a 5.5 hour rate, is shown in FIG. 4. The operating temperature was 250° C., and the current 10 mA. The time at open circuit between steps was 30 minutes, with the step time on charge being 10 minutes and the step time on discharge 30 minutes.

The open circuit voltage remained constant at 1.00 volts throughout the charge/discharge.

EXPERIMENT 3

In this experiment a manganese/nickel cell or system in which the Ni electrode was doped with sulphur, was tested. The overall reaction for such a cell or system is

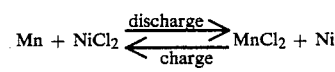

$$Mn + NiCl_2 \underset{charge}{\overset{discharge}{\rightleftarrows}} MnCl_2 + Ni$$

The electrode specifications for this cell or system were as given in Table 3:

TABLE 3

|  | Ni(S) | Mn |
| --- | --- | --- |
| Backbone metal | Ni | Ni |
| Current collector | Ni | Ni |
| % conversion of metal | 40 | 40 |
| Sintering temperature (° C.) | 790 | 790 |
| Mass metal (g) | 0.343 | 0.123 |
| Mass NaCl (g) | 0.273 | 0.209 |
| Mass backbone metal (g) | None | 0.131 |
| Theoretical electrode capacity (mAh)* | 125 | 96 |
| Mass Sulphur in electrode (g) | 0.015 | None |
| % doping with sulphur (%) | 2.4 | None |

*Theoretical cell capacity = 96 mAh

Figure 5:
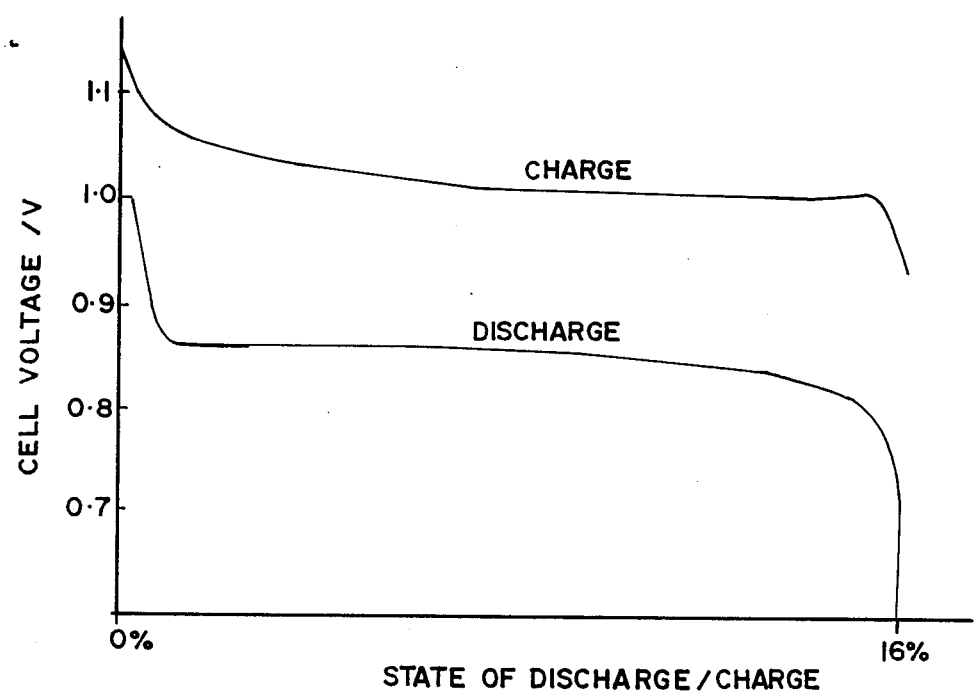

The melt was doped with 1% (by mass) sulphur. FIG. 5 shows a charge/discharge curve for this cell or system, charged and discharged at a 5 hour rate. Despite the relatively low capacity utilization of the cell (16%), the coulombic efficiency was 100%, which highlights the good reversibility of the system. It is believed that the electrode utilization can be significantly improved by cell design selection and optimization of, for example, electrode surface area and preparation.

The operating temperature was 250° C., and the current 19.2 mA. The open circuit voltage or potential was 0.93 V.

To obtain a desired cell voltage, the transition metal halides and transition metals are selected appropriately. For example, for an open circuit voltage of about 1,7 V, the anode may be Ti and the cathode Mo, with the electrolyte being $NaAlCl_4$ and NaCl, as described hereinbefore.

It is further desirable to use as high an oxidation state of the selected transition metal as possible, to enhance the capacity and operating voltage of the cell. Thus, for example, metals such as chromium, molybdenum and tungsten, which are oxidizable to valencies of 4+ and above, are believed to be attractive species for use as cathode substances of the cell in charged state. Similarly, it is desirable to use, as anode substances of the cell in charged state, transition metals in their ground state, i.e. valency equal to zero.

The cells according to the invention can be primary or secondary cells, and can be used to form a battery of cells.

I claim:

1. An electrochemical cell which comprises, in its charged state,
   an anode comprising, as an active anode substance, (i) a metal halide $T(1)^{m+}X_m^-$ where $T(1)$ is a metal selected from the group consisting in the first series of transition elements, the second series of transition elements, tungsten, aluminium, silicon, tin and lead, m+ is the valency of the metal $T(1)$, and X is a halogen;
   a cathode comprising, as an active cathode substance, a metal halide $T(2)^{n+}X_n^-$, where $T(2)$ is a metal selected from the group consisting in the first series of transition elements, the second series of transition elements, tungsten, aluminium, silicon, tin and lead, n+ is the valency of the metal $T(2)$, and X is a halogen; and
   a liquid electrolyte, E, containing halogen ions $X^-$, when the active anode and cathode substances are $T(1)^{m+}X_m^-$ and $T(2)^{n+}X_n^-$ respectively, as well as at least one compatible cation, with the active anode and cathode substances being substantially insoluble in the electrolyte at the operating temperature of the cell, at all states of charge and discharge.

2. An electrochemical cell according to claim 1, wherein X of the anode and the cathode is the same species.

3. An electrochemical cell according to claim 2, which includes a solid phase AX in the electrolyte E, where A is a compatible cation, and X is the same halogen as is present in the anode and cathode.

4. An electrochemical cell according to claim 3, wherein A is an alkali metal, with the solid phase AX being located in close proximity to the electrodes.

5. An electrochemical cell according to claim 3, wherein the electrolyte, E, is a molten alkali metal halide salt of the formula $M^1M^2X_d$, where $M^1$ is an alkali metal, $M^2$ is Al or Zn, and d=b+c, where b is the valency of $M^1$ and c is the valency of $M^2$.

6. An electrochemical cell according to claim 5, wherein the electrolyte, E, is $NaAlCl_4$ in which the proportion or ratio of alkali metal ions and aluminium ions is about one, to obtain substantial insolubility of the active anode and cathode substances therein.

7. An electrochemical cell according to claim 6, wherein $T(1)$ and $T(2)$ are different metals.

8. An electrochemical cell according to claim 7, wherein $T(1)$ is Fe, $T(2)$ is Ni, X is chlorine, and AX is NaCl, so that the overall cell discharge reaction is

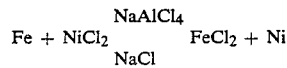

9. An electrochemical cell according to claim 7, wherein $T(1)$ is Mn, $T(2)$ is Ni, X is chlorine, and AX is NaCl, ao that the overall cell discharge reaction is:

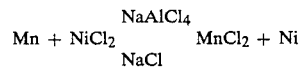

10. An electrochemical cell according to claim 6, wherein $T(1)$ and $T(2)$ are the same metal, which metal hence has a number of oxidation states.

11. An electrochemical cell according to claim 10, wherein $T(1)$ and $T(2)$ are V, X is chlorine and AX is NaCl so that the overall cell discharge reaction is
    V(anode)+2VCl_3(cathode)
    VCl_2(anode)+2VCl_2(cathode)

12. An electrochemical cell according to claim 6, which includes as a suitable separator separating the anode from the cathode so that the anode is located in an anode from the cathode so that the anode is located in an anode compartment and the cathode in a cathode compartment, a sodium beta alumina solid conductor.

13. An electrochemical cell according to claim 6, which includes, in the electrolyte, a minor proportion of an additive capable of suppressing the solubility of the active anode and cathode substances therein.

14. An electrochemical cell according to claim 13, wherein the additive is $F^-$, $Br^-$, or $S^=$.

15. An electrochemical cell according to claim 14, wherein the additive or dopant is NaF, with the NaF forming part of the AX solid phasing, and the proportion of NaF being sufficiently low for the electrolyte to retain its essential character as a sodium aluminium chloride electrolyte.

* * * * *

UNITED STATES PATENT AND TRADEMARK OFFICE
CERTIFICATE OF CORRECTION

PATENT NO. : 4,975,345

DATED : December 4, 1990

INVENTOR(S) : Johan Coetzer

It is certified that error appears in the above-identified patent and that said Letters Patent is hereby corrected as shown below:

Title Page:

In the abstract, at line 3, delete "(i)".

In the specification, at column 1, line 8, delete "(i)".

In the specification, at column 4, line 3, after "FIG.", delete "3" and insert --2--.

In claim 1, at column 7, line 35, delete "(i)".

In claim 12, at column 8, lines 46-47, delete "an anode from the cathode so that the anode is located in".

Signed and Sealed this

Sixth Day of October, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,975,345  Page 2 of 2

DATED : December 4, 1990

INVENTOR(S) : Johan Coetzer

It is certified that error appears in the above-identified patent and that said Letters Patent is hereby corrected as shown below:

In the drawings, Figure 2 should appear as follows:

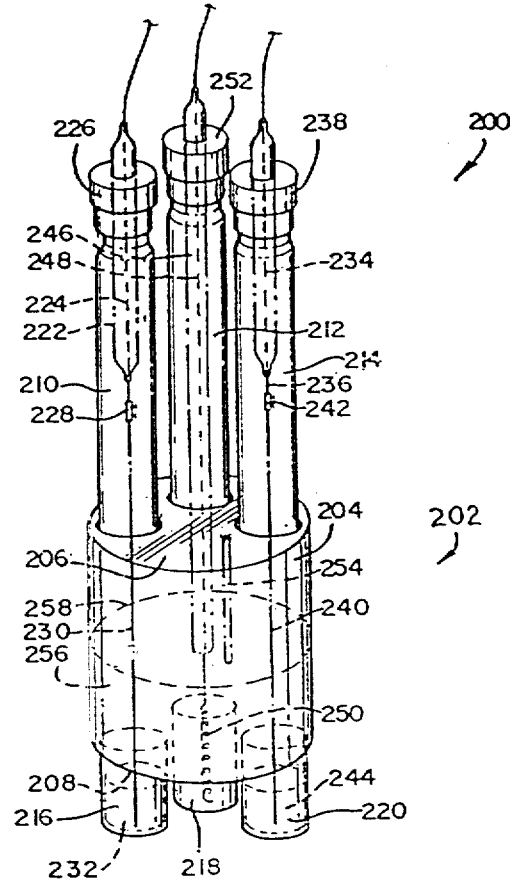

FIG 2